(12) United States Patent
Yoshida et al.

(10) Patent No.: US 9,108,718 B2
(45) Date of Patent: Aug. 18, 2015

(54) COMPOSITE-MATERIAL STRUCTURE AND AIRCRAFT MAIN WING AND AIRCRAFT FUSELAGE PROVIDED WITH THE SAME

(75) Inventors: Shinichi Yoshida, Tokyo (JP); Hideaki Tanaka, Tokyo (JP); Yuya Tanaka, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 310 days.

(21) Appl. No.: 13/386,737

(22) PCT Filed: Oct. 5, 2010

(86) PCT No.: PCT/JP2010/067475
§ 371 (c)(1),
(2), (4) Date: Jan. 24, 2012

(87) PCT Pub. No.: WO2011/043346
PCT Pub. Date: Apr. 14, 2011

(65) Prior Publication Data
US 2012/0121854 A1    May 17, 2012

(30) Foreign Application Priority Data
Oct. 8, 2009   (JP) .................................. 2009-234633

(51) Int. Cl.
*B32B 3/14*     (2006.01)
*B32B 3/24*     (2006.01)
(Continued)

(52) U.S. Cl.
CPC .................. *B64C 3/187* (2013.01); *B64C 1/061* (2013.01); *B64C 1/068* (2013.01); *B64C 1/069* (2013.01); *B64C 3/182* (2013.01); *B64C 3/26* (2013.01);
(Continued)

(58) Field of Classification Search
CPC .......... B64C 1/06; B64C 1/068; B64C 1/069; B64C 1/12; B64C 1/14; B64C 1/1484; B64C 1/1492
See application file for complete search history.

(56) References Cited

U.S. PATENT DOCUMENTS 2,327,636 A  *  8/1943  Gerber .......................... 244/120
2,383,623 A  *  8/1945  Spicer ........................ 52/801.11
(Continued)

FOREIGN PATENT DOCUMENTS

JP         59089842 A  *  5/1984   ................ F16F 1/18
JP         62-157894        7/1987
(Continued)

OTHER PUBLICATIONS

English Abstract for JP 59089842 A, May 1984.*
(Continued)

*Primary Examiner* — Jeff Vonch
(74) *Attorney, Agent, or Firm* — Wenderoth, Lind & Ponack, L.L.P.

(57) ABSTRACT

A main wing (1) on which a tensile load is exerted in a longitudinal direction includes a holed structural member that is a composite material made of fiber reinforced plastic which extends in the longitudinal direction and in which access holes (5) are formed and that serves as a center portion (3b); and a front portion (3a) and a rear portion (3c) that are composite materials made of fiber reinforced plastic which extend in the longitudinal direction of the main wing and which are connected to side portions of the center portion. The tensile rigidity of the center portion in the longitudinal direction is set to be lower than the tensile rigidity of the front portion and the rear portion in the longitudinal direction.

12 Claims, 8 Drawing Sheets

(51) Int. Cl.

| | | |
|---|---|---|
| *B32B 3/26* | (2006.01) | |
| *B32B 7/02* | (2006.01) | |
| *B32B 7/08* | (2006.01) | |
| *B64C 1/12* | (2006.01) | |
| *B64C 1/00* | (2006.01) | |
| *B64C 1/06* | (2006.01) | |
| *B64C 3/00* | (2006.01) | |
| *B64C 3/26* | (2006.01) | |
| *B64C 3/18* | (2006.01) | |
| *B64C 1/14* | (2006.01) | |
| *B32B 7/00* | (2006.01) | |
| *B32B 3/08* | (2006.01) | |

(52) U.S. Cl.
CPC .... *B32B 3/08* (2013.01); *B32B 3/14* (2013.01); *B32B 3/263* (2013.01); *B32B 3/266* (2013.01); *B32B 7/005* (2013.01); *B32B 7/02* (2013.01); *B32B 7/08* (2013.01); *B64C 1/064* (2013.01); *B64C 1/1446* (2013.01); *B64C 1/1492* (2013.01); *B64C 2001/0072* (2013.01); *Y02T 50/433* (2013.01)

(56) References Cited

U.S. PATENT DOCUMENTS

| | | | |
|---|---|---|---|
| 3,429,530 A * | 2/1969 | Hertel | 244/129.3 |
| 4,556,591 A * | 12/1985 | Bannink, Jr. | 428/43 |
| 4,643,646 A | 2/1987 | Hahn et al. | |
| 4,732,542 A | 3/1988 | Hahn et al. | |
| 4,741,943 A * | 5/1988 | Hunt | 428/113 |
| 4,749,155 A | 6/1988 | Hammer et al. | |
| 5,452,867 A * | 9/1995 | Grunwald et al. | 244/117 R |
| 5,922,446 A * | 7/1999 | Piening et al. | 428/292.1 |
| 6,105,902 A * | 8/2000 | Pettit | 244/119 |
| 6,190,484 B1 * | 2/2001 | Appa | 156/189 |
| 6,237,873 B1 * | 5/2001 | Amaoka et al. | 244/123.7 |
| 6,485,594 B1 * | 11/2002 | Pabsch et al. | 156/213 |
| 6,502,788 B2 * | 1/2003 | Noda et al. | 244/123.3 |
| 6,736,352 B2 * | 5/2004 | Bladt et al. | 244/129.3 |
| 6,907,651 B1 * | 6/2005 | Fisher et al. | 29/407.05 |
| 7,438,263 B2 * | 10/2008 | Rassaian et al. | 244/129.3 |
| 7,629,037 B2 * | 12/2009 | Gaitonde | 428/131 |
| 7,780,808 B2 * | 8/2010 | Godbehere et al. | 156/166 |
| 8,016,235 B2 * | 9/2011 | Ramirez Blanco et al. | 244/119 |
| 8,114,329 B2 * | 2/2012 | Karem | 264/258 |
| 8,282,042 B2 * | 10/2012 | Parikh et al. | 244/132 |
| 8,398,910 B2 * | 3/2013 | Kastner et al. | 264/258 |
| 8,444,088 B2 * | 5/2013 | Pahl | 244/119 |
| 8,529,727 B2 * | 9/2013 | Bense | 156/293 |
| 8,684,311 B2 * | 4/2014 | Nordman et al. | 244/131 |
| 8,752,293 B2 * | 6/2014 | Jones et al. | 29/897.2 |
| 2003/0226935 A1 * | 12/2003 | Garratt et al. | 244/123 |
| 2004/0035979 A1 * | 2/2004 | McCoskey et al. | 244/117 R |
| 2004/0161585 A1 * | 8/2004 | Gaitonde | 428/131 |
| 2005/0121554 A1 * | 6/2005 | Fournie et al. | 244/119 |
| 2005/0236524 A1 * | 10/2005 | Sarh | 244/124 |
| 2006/0071127 A1 * | 4/2006 | Wood et al. | 244/129.3 |
| 2007/0024562 A1 | 2/2007 | Choi | |
| 2008/0078876 A1 * | 4/2008 | Baggette et al. | 244/129.3 |
| 2008/0128553 A1 * | 6/2008 | Brown et al. | 244/124 |
| 2008/0164376 A1 * | 7/2008 | Kato et al. | 244/132 |
| 2008/0210819 A1 * | 9/2008 | Jarsaillon et al. | 244/120 |
| 2009/0159749 A1 * | 6/2009 | Etzkorn et al. | 244/131 |
| 2009/0176426 A1 * | 7/2009 | Duffy | 442/181 |
| 2010/0032523 A1 * | 2/2010 | Gallant et al. | 244/120 |
| 2010/0077690 A1 * | 4/2010 | Durand | 52/578 |
| 2011/0299993 A1 * | 12/2011 | Soula et al. | 416/226 |

FOREIGN PATENT DOCUMENTS

| | | | |
|---|---|---|---|
| JP | 62-168789 | 7/1987 | |
| JP | 1-263030 | 10/1989 | |
| JP | 3-12232 | 2/1991 | |
| JP | 4-89326 | 8/1992 | |
| JP | 2000-6893 | 2/2000 | |
| JP | 2001-30997 | 2/2001 | |
| JP | 2002-302097 | 10/2002 | |
| JP | 2003-513821 | 4/2003 | |
| JP | 2007-15203 | 1/2007 | |
| JP | 2010-505700 | 2/2010 | |
| JP | 5308533 | 10/2013 | |
| RU | 12819 U1 | 2/2000 | |
| RU | 2 191 137 | 10/2002 | |
| RU | 2191137 C2 * | 10/2002 | B64C 3/44 |
| WO | 01/34381 | 5/2001 | |
| WO | 2008/043940 | 4/2008 | |

OTHER PUBLICATIONS

Decision to Grant a Patent issued Jun. 4, 2013 in corresponding Japanese Application No. 2011-535405.
Explanation of Office Action dated May 20, 2013 in corresponding Russian Application No. 2012102328.
Office Action dated May 20, 2013 in corresponding Russian Application No. 2012102328.
International Search Report issued Dec. 28, 2010 in corresponding International Application No. PCT/JP2010/067475.
Decision on patent grant for invention issued Oct. 18, 2013 in corresponding Russian Application No. 2012102328/11(003348) (with English translation).
Notice of Allowance issued Jan. 10, 2014 in corresponding Canadian patent application No. 2768957.
Notice of Allowance issued Sep. 29, 2014 in corresponding Chinese patent application No. 201080033977.3.
International Search Report issued May 1, 2012 in International Application No. PCT/JP2012/052517.
Written Opinion of the International Searching Authority issued May 1, 2012 in International Application No. PCT/JP2012/052517.
Office Action issued Apr. 30, 2014 in corresponding Japanese patent application No. 2012-555973 (with English translation).
Decision to Grant a Patent issued Oct. 21, 2014 in corresponding Japanese patent application No. 2012-555973.
Notice of Allowance issued Jan. 22, 2015 in corresponding Russian patent application No. 2013119076.
Official Action dated Feb. 12, 2015 in U.S. Appl. No. 13/881,620.
Official Action dated Jun. 11, 2015 in U.S. Appl. No. 13/881,620.

* cited by examiner

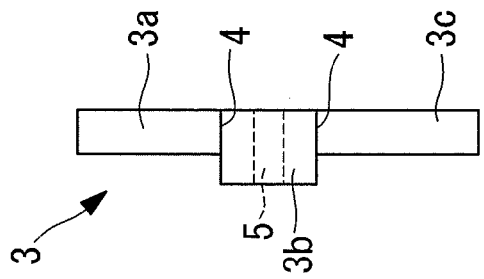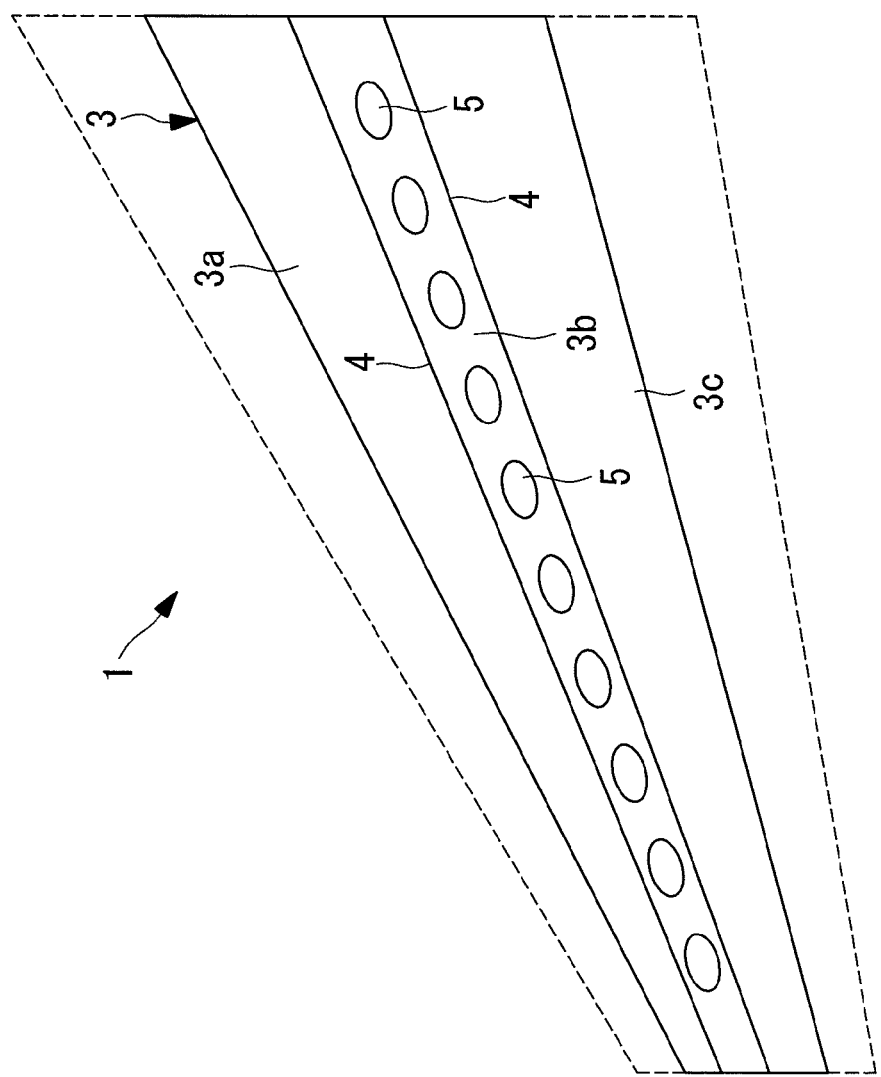

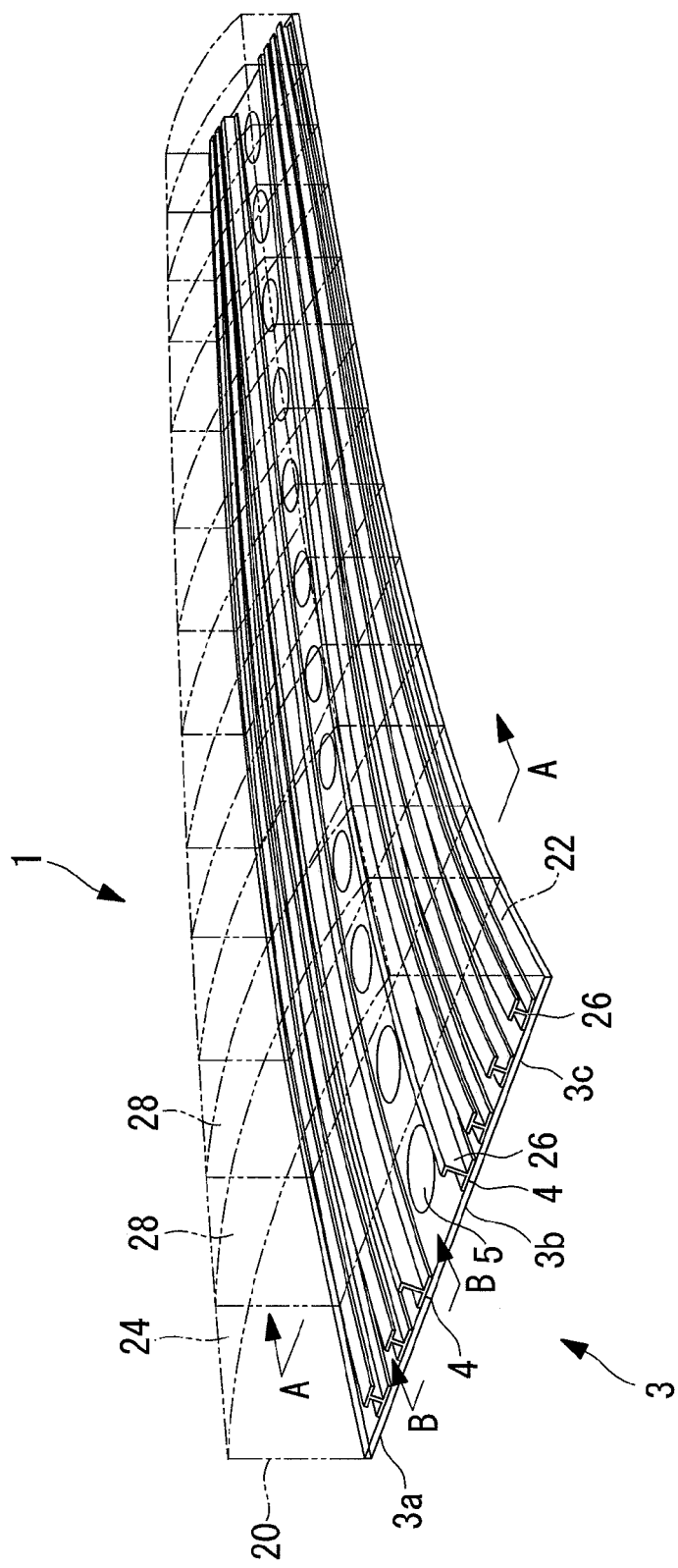

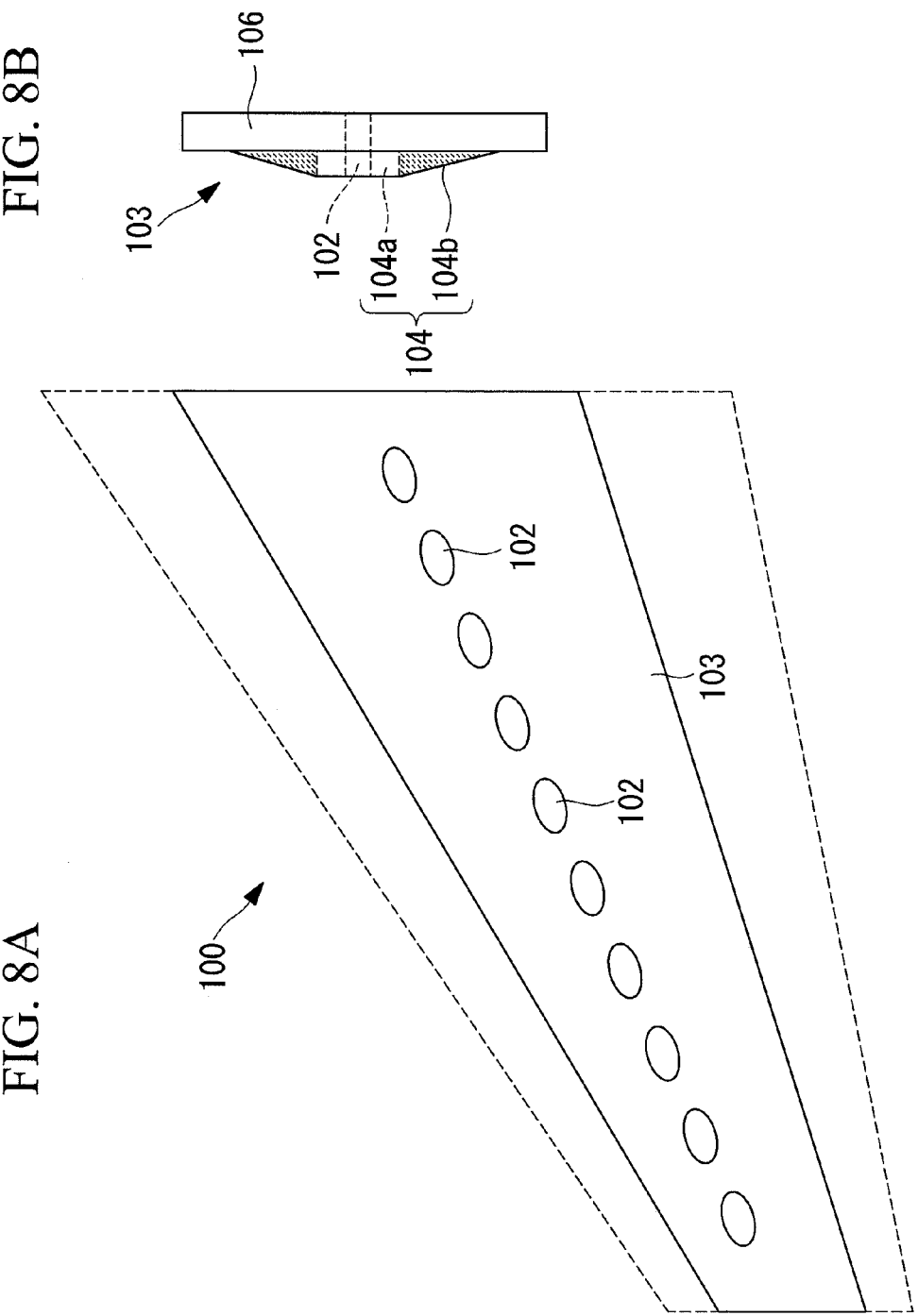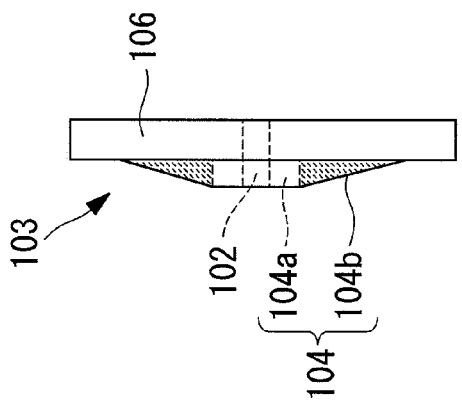

COMPOSITE-MATERIAL STRUCTURE AND AIRCRAFT MAIN WING AND AIRCRAFT FUSELAGE PROVIDED WITH THE SAME

BACKGROUND OF THE INVENTION

1. Technical Field

The present invention relates to a composite-material structure having a hole and to an aircraft main wing and an aircraft fuselage provided with the same.

2. Description of the Related Art

In the fields of, for example, aircraft, ships, vehicles, etc., composite materials made of fiber reinforced plastics (FRP: Fiber reinforced Plastics) are widely employed as high-strength, lightweight structures. A hole sometimes is formed in such composite materials to provide access for inspection and during assembly. In the case where the hole is formed, because stress concentration occurs at the circumferential edge of the hole, the strength at the circumferential edge of the hole needs to be enhanced.

Patent Literature 1 described below discloses an invention that, to reinforce the circumferential edge of an access hole in the skin of an aircraft, increases the thickness thereof by adding a reinforcing layer, thus increasing the strength thereof. The reinforcing layer disclosed in Patent Literature 1 is secured to a base with pins or stitches to prevent it from peeling off when subjected to a load.

CITATION LIST

Patent Literature

{PTL 1} Japanese Translation of PCT International Application, Publication No. 2003-513821.

SUMMARY OF THE INVENTION

1. Technical Problem

However, the invention disclosed in the above-described Patent Literature 1 has a problem with productivity because there is an additional process of applying pins or stitches when adding the reinforcing layer.

As a method in which such pins or stitches are not employed, a bottom-surface skin 103 of a main wing 100 in an aircraft having a structure shown in FIGS. 8A and 8B is known. As shown in FIG. 8A, a plurality of access holes 102 are formed at a widthwise center portion in the bottom-surface skin 103. The access holes 102 are used for inspecting a fuel tank or during assembly. Note that broken lines shown in the figure indicate the outline of the main wing 100, including a flap, a slat, etc.

As shown in FIG. 8B, reinforcing laminates 104 are stacked (padded up) on base laminates 106 to reinforce circumferential edges of the access holes 102. The reinforcing laminates 104 have shapes that, when viewed in cross-section as in FIG. 8B, taper is formed such that the thicknesses thereof decrease as the distance from the access holes 102 increases. Although fixed-thickness portions 104a, which have fixed thicknesses and are positioned at the circumferential edges of the access holes 102, are adequate to reinforce the access holes 102, if only the fixed-thickness portions 104a are provided, peeling occurs at the interfaces with the bases 106 when subjected to a load. In order to prevent this peeling, instead of providing only the fixed-thickness portions 104a, tapering portions 104b are formed extending further therefrom, and the thicknesses thereof gradually increase. Note that, although the tapering portions 104b are shown with a hatched pattern in FIG. 8B for ease of understanding, the tapering portions 104b and the fixed-thickness portions 104a are continuous and are formed of the same laminated sheets.

However, although the structure like that in FIGS. 8A and 8B makes the process of applying pins or stitches, such as those in the above-described Patent Literature 1, unnecessary, solely from the viewpoint of reinforcing the access holes 102, there is no inherent need for the tapering portions 104b, and they cause an increase in weight.

The present invention has been conceived in light of the above-described circumstances, and an object thereof is to provide a composite-material structure that can be made lighter, taking into consideration the stress concentration at circumferential edges of holes, and an aircraft main wing and an aircraft fuselage provided with the same.

2. Solution to the Problem

In order to solve the above-described problems, a composite-material structure of the present invention and an aircraft main wing and an aircraft fuselage provided with the same employ the following solutions.

A composite-material structure of the present invention is a composite-material structure including a holed structural member that is a composite material made of fiber reinforced plastic which extends in one direction and in which a hole is formed; and an adjacent structural member that is a composite material made of fiber reinforced plastic which extends in the one direction and which is connected to a side portion of the holed structural member, wherein a tensile load and/or a compressive load are/is applied in the one direction, and wherein a tensile rigidity and/or a compressive rigidity of the holed structural member in the one direction are/is lower than a tensile rigidity and/or a compressive rigidity of the adjacent structural member in the one direction.

Because the tensile rigidity of the holed structural member in the one direction is lower than the tensile rigidity of the adjacent structural member in the one direction, a tensile load is mainly borne by the adjacent structural member. Therefore, because the tensile load exerted on the holed structural member becomes relatively low, a stress concentration occurring at a circumferential edge that forms the hole is alleviated. Accordingly, as compared with a case in which the holed structural member is given an equivalent tensile rigidity to the adjacent structural member, reinforcement at the circumferential edge of the hole can be reduced.

In the case where the compressive rigidity of the holed structural member in the one direction is lower than the compressive rigidity of the adjacent structural member in the one direction, a compressive load is mainly borne by the adjacent structural member. Therefore, because a compressive load exerted on the holed structural member becomes relatively low, stress concentration occurring at the circumferential edge that forms the hole is alleviated. Accordingly, as compared with a case in which the holed structural member is given an equivalent compressive rigidity to the adjacent structural member, reinforcement at the circumferential edge of the hole can be reduced.

In a case where a tensile load and a compressive load are exerted (i.e., a case in which a bending load is exerted) on the composite-material structure, the tensile rigidity and compressive rigidity of the holed structural member in the one direction should be made lower than tensile rigidity and compressive rigidity of the adjacent structural member in the one direction, and thus, the tensile load and the compressive load should be mainly borne by the adjacent structural member.

With the composite-material structure of the present invention, the holed structural member is a composite material whose main components are fibers oriented in directions of +/−30° or greater and +/−60° or less, or preferably in the directions of +/−45°.

Because the composite material is mainly formed of the fibers oriented in the directions of +/−30° or greater and +/−60° or less, or preferably in the directions of +/−45°, the tensile rigidity in the 0° direction (the one direction) is lowered, and a composite material that allows stretching in the tensile direction (and/or the compression direction) can be realized. In addition, because the fibers are mainly provided in the directions of +/−30° or greater and +/−60° or less, or preferably in the directions of +/−45°, the strength in the shearing direction (the direction perpendicular to the one direction, i.e., directions of +/−90°) is increased, and the torsional rigidity can be increased.

Note that "mainly formed of the fibers oriented in the directions of +/−30° or greater and +/−60° or less, or preferably in the directions of +/−45°" means that the blending ratio of the fibers in the directions of +/−30° or greater and +/−60° or less, or preferably in the directions of +/−45°, is higher than in a generally employed composite material (for example, the adjacent structural member). This means that the blending ratio is higher than it is in, for example, an ordinary composite material employed in a main wing of an aircraft, whose blending ratio is about 60% ((0°, +45°, −45°, 90°)=(30%, 30%, 30%, 10%)) for the fibers in the directions of +/−45°, i.e., for example, 70% or greater, or preferably 80% or greater.

To reduce the rigidity in the 0° direction in the holed structural member further, it is preferable that the fibers in the 0° direction be a material having lower rigidity than the fibers in the directions of +/−30° or greater and +/−60° or less, or preferably in the directions of +/−45°. For example, in the case where carbon fibers are employed in the directions of +/−30° or greater and +/−60° or less, or preferably in the directions of +/−45°, glass fibers or aramid fibers are employed.

With the composite-material structure of the present invention, a bottom-surface skin of a main wing in an aircraft is formed of a plurality of composite materials having division surfaces that extend in a longitudinal direction of the main wing, and, of these composite materials, a composite material having an access hole as the hole formed in the bottom-surface skin serves as the holed structural member, and other composite materials serve as the adjacent structural members.

The bottom-surface skin forms a bottom-surface portion of a torque box that bears a load exerted on the main wing of the aircraft. Therefore, this bottom-surface skin is subjected to a tensile load in the main-wing longitudinal direction during flight. Because the composite material in which the access hole is formed serves as the above-described holed structural member, and the composite material connected to the holed structural member serves as the above-described adjacent structural member, the tensile load is mainly borne by the adjacent structural member, and only relatively low tensile load is exerted on the holed structural member. Therefore, the reinforcement at the circumferential edge of the access hole can be reduced, and a main wing with reduced weight can be provided.

With the composite-material structure of the present invention, a skin of a fuselage of an aircraft is formed of a plurality of composite materials having division surfaces that extend in a longitudinal direction of the fuselage, and, of these composite materials, a composite material having a window hole as the hole formed in the skin serves as the holed structural member, and other composite materials serve as the adjacent structural members.

The fuselage of the aircraft is subjected to a tensile load and a compressive load (that is, a bending load) in the longitudinal direction. Because the composite material in which the window hole is formed serves as the above-described holed structural member and the composite material connected to the holed structural member serves as the above-described adjacent structural member, the tensile load and the compressive load are mainly borne by the adjacent structural member, and only relatively low tensile load and compressive load are exerted on the holed structural member. Therefore, the reinforcement at the circumferential edge of the access hole can be reduced, and a main wing with reduced weight can be provided.

3. Advantageous Effects of the Invention

With a composite-material structure of the present invention and an aircraft main wing and an aircraft fuselage provided with the same, because the tensile rigidity and/or compressive rigidity of a holed structural member are/is made lower than the tensile rigidity and/or compressive rigidity of an adjacent structural member, thereby reducing concentrated stress exerted at a circumferential edge of a hole, a reinforcing structure for the circumferential edge of the hole can be simplified, and the weight thereof can be reduced.

BRIEF DESCRIPTION OF THE DRAWINGS

FIG. 1A shows a plan view of a bottom-surface skin of a main wing of an aircraft according to a first embodiment of a composite-material structure of the present invention.

FIG. 1B shows a longitudinal sectional view of a bottom-surface skin of a main wing of an aircraft according to a first embodiment of a composite-material structure of the present invention.

FIG. 2 is a perspective view showing the bottom-surface skin and a stringer that form a part of the main wing, having a box structure.

FIG. 8A shows a plan view of a bottom-surface skin of a main wing of an aircraft in the related art.

FIG. 8B shows a longitudinal sectional view of a bottom-surface skin of a main wing of an aircraft in the related art.

DETAILED DESCRIPTION OF THE INVENTION

An embodiment of the present invention will be described below, using FIGS. 1A to 3.

FIGS. 1A and 1B shows a bottom-surface skin 3 of a main wing 1 of an aircraft. The bottom-surface skin 3 is formed of a composite-material structure made of fiber reinforced plastics (FRP: Fiber reinforced Plastics). Broken lines shown in the figure indicate the outline of the main wing 1, including a flap, a slat, etc.

Figure 3:
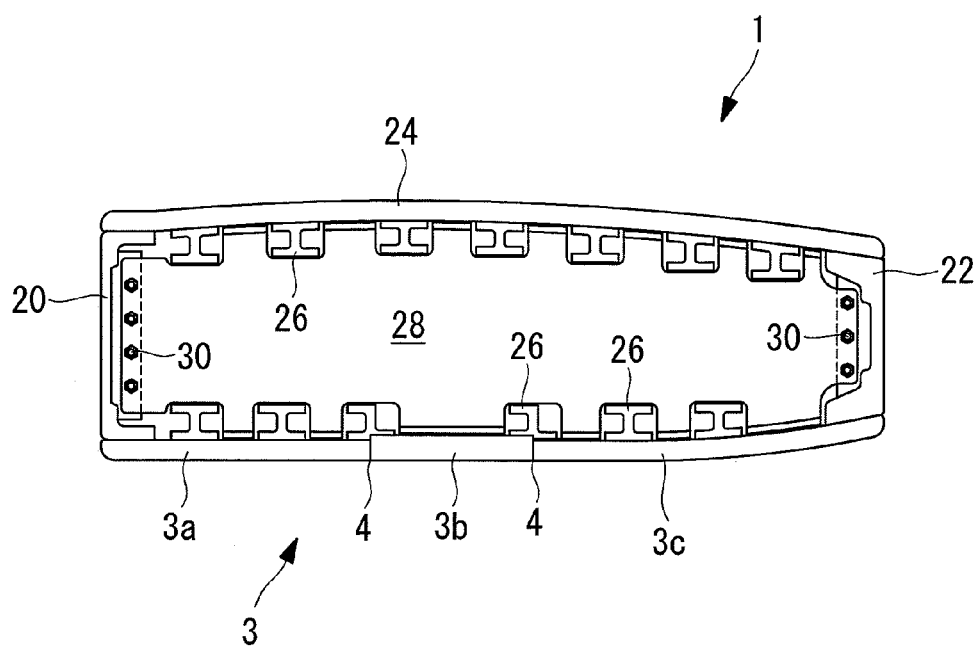
FIG. 3 is a lateral sectional view taken along A-A in FIG. 2.

As shown in FIGS. 2 and 3, the bottom-surface skin 3 forms a box-shaped torque box together with a front spar 20 and rear spar 22 that serve as side skins, which stand upright at both ends in the width direction of the bottom-surface skin 3, and a top surface skin 24 that connects top ends of the front spar 20 and the rear spar 22 with each other and thereby, the bottom-surface skin 3 bears a load in the main wing 1.

The bottom-surface skin 3 is formed of three portions, that is, a front portion (adjacent structural member) 3a that is positioned at a leading edge side of the main wing 1, a center portion 3b that is connected to the front portion 3a, and a rear portion (adjacent structural member) 3c that is connected to the center portion 3b and that is positioned at a trailing edge side of the main wing 1. The front portion 3a, the center portion 3b, and the rear portion 3c are each connected with fasteners or by bonding at division surfaces 4 that extend in the longitudinal direction of the main wing 1. As will be described later, fastener connection or bonding connection may be appropriately selected.

As shown in FIGS. 2 and 3, a plurality of stringers 26 is provided in the longitudinal direction of the main wing 1. The stringers 26 are made of the FRP composite material, as with the bottom-surface skin 3, etc. Each stringer 26 is secured to inner surfaces of the bottom-surface skin 3 and the top-surface skin 24, and mainly bears a load in the longitudinal direction of the main wing 1.

Ribs 28 are provided inside the main wing 1 having the box structure so as to divide the internal space into multiple sections in the longitudinal direction. The ribs 28 are plate-like, extending in the width direction (a direction perpendicular to the longitudinal direction) of the main wing 1, and a plurality of them are arranged at predetermined intervals in the longitudinal direction of the wing. As shown in FIG. 3, front and rear ends of each rib 28 are secured to the front spar 20 and the rear spar 22, respectively, with specified fasteners 30, such as bolts, nuts, etc.

The front portion 3a of the bottom-surface skin 3 is made of a composite material whose main components are carbon fiber reinforced plastics (CFRP: Carbon Fiber reinforced Plastics). The ratios of the orientations of the carbon fibers are set approximately to those normally employed in aircraft structures; for example, the configuration thereof is such that a plurality of sheets, which include the individual fiber orientations, are stacked so that (0°, +45°, −45°, 90°)=(30%, 30%, 30%, 10%), when the direction in which the main wing 1 extends (longitudinal direction) is defined as 0°. The number of laminated layers in the composite material employed in the front portion 3a is determined by the strength to be borne thereby, and is set to, for example, several tens of layers.

As with the front portion 3a, the rear portion 3c of the bottom-surface skin 3 is made of a composite material whose main components are carbon fiber reinforced plastics (CFRP). As with the front portion 3a, the ratios of the orientations of the carbon fibers are set approximately to those normally employed in aircraft structures; for example, the configuration thereof is such that a plurality of sheets, which include the individual fiber orientations, are stacked so that (0°, +45°, −45°, 90°)=(30%, 30%, 30%, 10%), when the direction in which the main wing 1 extends (longitudinal direction) is defined as 0°. The number of laminated layers in the composite material employed in the rear portion 3c is determined by the strength to be borne thereby, and is set to, for example, several tens of layers.

The center portion 3b of the bottom-surface skin 3 is made of a composite material whose main components are the carbon fiber reinforced plastics (CFRP). A plurality of access holes (holes) 5, which are used for inspecting a fuel tank provided inside the main wing 1, during assembly, etc. are formed at predetermined intervals along the extending direction of the main wing 1. In this way, the center portion 3b is formed as a holed structural member. Note that the access holes 5 are not formed in the front portion 3a and the rear portion 3c described above.

As shown in FIG. 1B, the center portion 3b has a fixed thickness; the number of laminated layers is greater as compared with the front portion 3a and the rear portion 3c; and thus, the thickness thereof is greater by a corresponding amount.

The ratios of the orientations of the carbons fibers in the center portion 3b differ from those for the front portion 3a and the rear portion 3c, and are mainly set at +/−45° when the extending direction of the main wing 1 is defined as 0°. Specifically, the orientation ratios for +/−45° are greater than those in the front portion 3a and the rear portion 3c; the configuration thereof is such that a plurality of sheets, which include the individual fiber orientations, are stacked so that, for example, the orientation ratios for +/−45° are 70% or greater, or preferably 80% or greater. Furthermore, in order to reduce tensile rigidity in the 0° direction, fibers in the 0° direction may be changed from the carbon fibers to glass fibers (Glass fiber) or aramid fibers (Aramid fiber).

Methods of connecting the front portion 3a and the rear portion 3c with the center portion 3b of the bottom-surface skin 3 will be described.

With this embodiment, although the proportion of the strength borne by the center portion 3b in the longitudinal direction is lower than the front portion 3a and the rear portion 3c, because the access holes 5 are formed and stress concentrates thereat, the plate thickness thereof is greater than the front portion 3a and the rear portion 3c. In this case, connecting methods shown in FIGS. 4A to 6C are applied.

In FIGS. 4A to 4D, in order to absorb a difference in plate thicknesses between the center portion 3b and the front portion 3a (or the rear portion 3c), an increased thickness portion 3d formed by gradually increasing the thickness thereof with a tapering portion 3e is provided at an end of the front portion 3a (or the rear portion 3c) close to the division surface 4. By doing so, the plate thicknesses among the center portion 3b, the front portion 3a, and the rear portion 3c become equal, and they can be stably secured via the stringers 26.

Figure 4A:
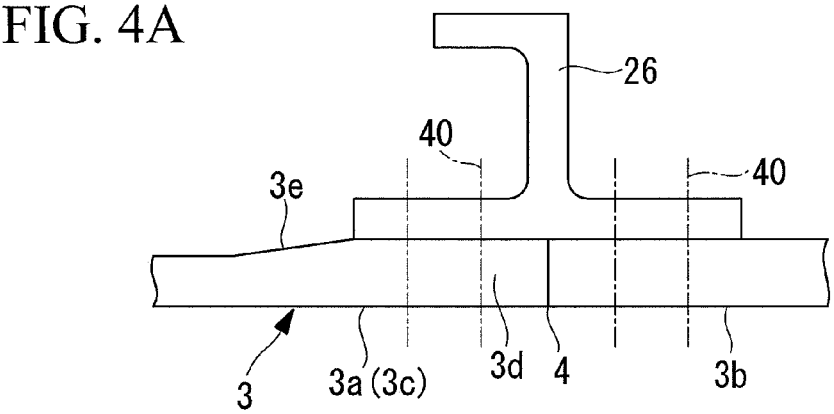
FIG. 4A is a lateral sectional view taken along B-B in FIG. 2, showing a method of securing the stringer and the bottom-surface skin.

The stringers 26 and the bottom-surface skin 3 (the center portion 3b, the front portion 3a, and the rear portion 3c) are secured at positions indicated by one-dot chain lines, as shown in FIG. 4A, with fasteners 40 formed of bolts, nuts, etc.

Figure 4B:
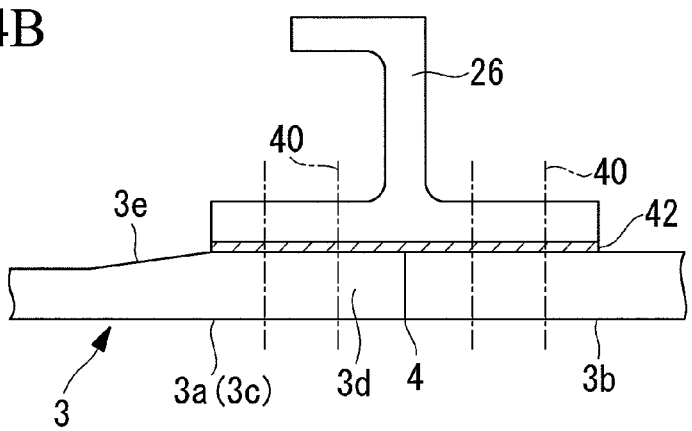
FIG. 4B is a lateral sectional view taken along B-B in FIG. 2, showing a method of securing the stringer and the bottom-surface skin.

As shown in FIG. 4B, a method in which the stringers 26 and the bottom-surface skin 3 (the center portion 3b, the front portion 3a, and the rear portion 3c) are secured with the fasteners 40 after being bonded at bonding portions 42 provided therebetween may be employed.

Figure 4C:
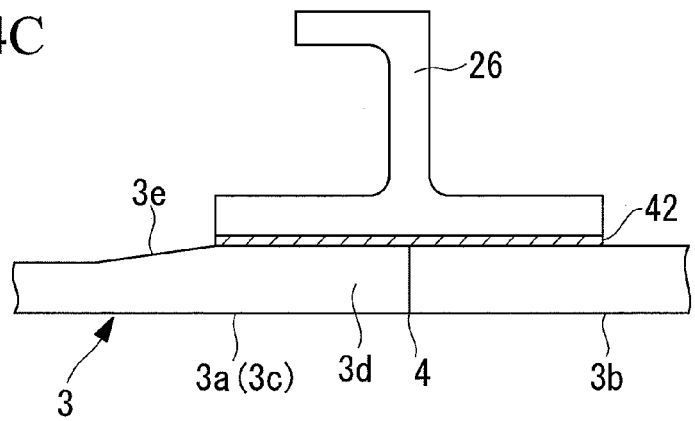
FIG. 4C is a lateral sectional view taken along B-B in FIG. 2, showing a method of securing the stringer and the bottom-surface skin.

As shown in FIG. 4C, a method in which securing is achieved only by bonding at the bonding portions 42, without using fasteners, may be employed.

In addition to a method in which the stringers 26 and the bottom surface skin 3 (the center portion 3b, the front portion 3a, and the rear portion 3c) are bonded with an adhesive after both of them are individually cured (post-curing bonding method), a co-bonding (co-bond) method in which an adhesive is interposed between the cured stringers 26 and pre-cured bottom-surface skin 3, which are then integrally cured by applying temperature and/or pressure, a co-curing (co-cure) method in which an adhesive is interposed between pre-cured stringers 26 and the pre-cured bottom-surface skin 3 that are then integrally cured by applying temperature and/or pressure, etc., can be employed in bonding. The bonding methods like these can also be applied to connecting methods in FIGS. 5A to 6C, described below.

Figure 4D:
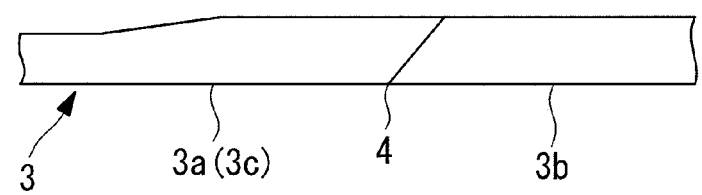
FIG. 4D is a lateral sectional view taken along B-B in FIG. 2, showing a method of securing the stringer and the bottom-surface skin.

As shown in FIG. 4D, the division surfaces 4 may be provided with inclinations with respect to the plate thickness direction. By forming the division surfaces 4 as such inclined surfaces, the surface area with which the center portion 3b and the front portion 3a (or the rear portion 3c) overlap and come in contact is increased; therefore, the connection therebetween can be made more stable. The division surfaces 4 like these can also be applied to the connecting methods in FIGS. 5A to 6C, described below.

In FIGS. 5A to 5D, in order to absorb a difference in plate thicknesses between the center portion 3b and the front portion 3a (or the rear portion 3c), fillers 44 are interposed between the stringers 26 and the front portion 3a (or the rear portion 3c). As the fillers 44, the same fiber reinforced composite material as that used in the front portion 3a, etc. can be employed, or a titanium alloy, etc. can also be employed.

Figure 5A:
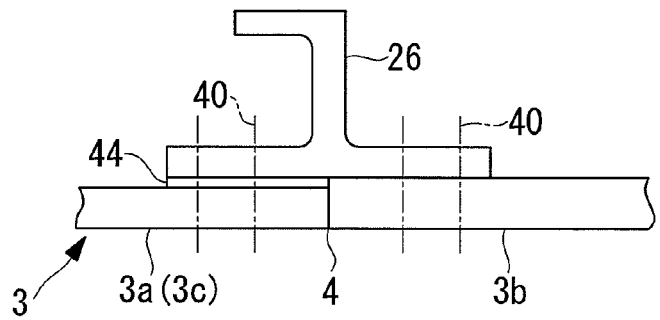
FIG. 5A is a lateral sectional view taken along B-B in FIG. 2, showing another method of securing the stringer and the bottom-surface skin.

Like FIG. 4A, FIG. 5A shows a method of securing the stringers 26 and the bottom-surface skin 3 (the center portion 3b, the front portion 3a, and the rear portion 3c) only with the fasteners 40.

Figure 5B:
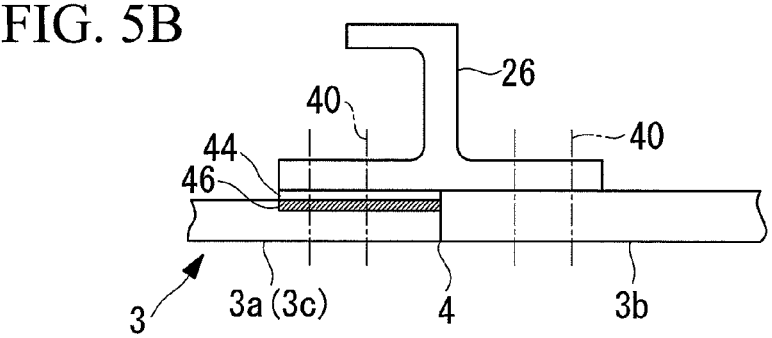
FIG. 5B is a lateral sectional view taken along B-B in FIG. 2, showing another method of securing the stringer and the bottom-surface skin.

FIG. 5B shows a method in which bonding portions 46 are provided between the fillers 44 and the front portion 3a (or the rear portion 3c), and the fasteners 40 are additionally employed for securing them.

Figure 5C:
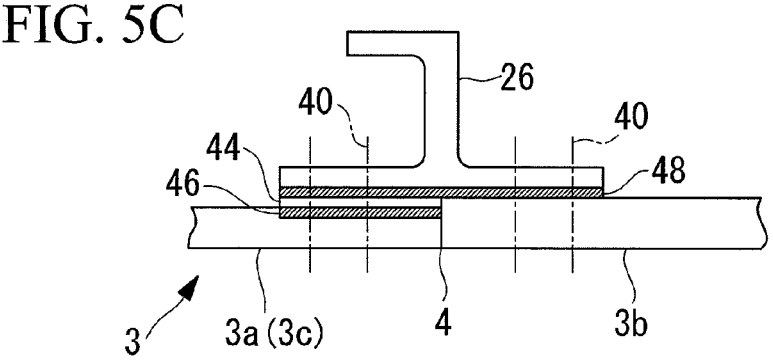
FIG. 5C is a lateral sectional view taken along B-B in FIG. 2, showing another method of securing the stringer and the bottom-surface skin.

FIG. 5C shows a method in which, in addition to that in FIG. 5B, bonding portions 48 are provided between the stringers 26 and both the center portion 3b and the front portion 3a (or the rear portion 3c) for securing them.

Figure 5D:
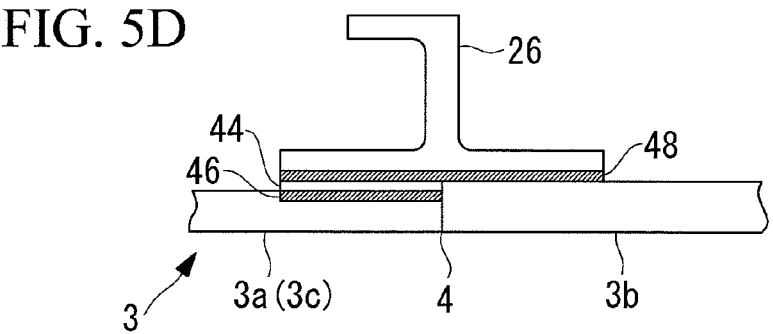
FIG. 5D is a lateral sectional view taken along B-B in FIG. 2, showing another method of securing the stringer and the bottom-surface skin.

FIG. 5D shows a method of securing only by bonding at the bonding portions 46 and 48, wherein the fasteners 40 employed in FIG. 5C are omitted.

Figure 6A:
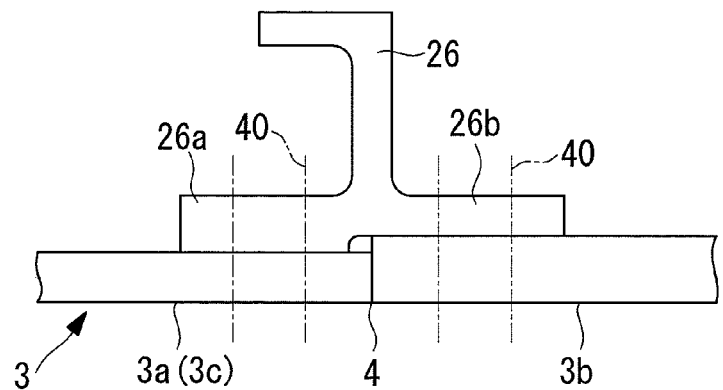
FIG. 6A is a lateral sectional view taken along B-B in FIG. 2, showing another method of securing the stringer and the bottom-surface skin.
Figure 6B:
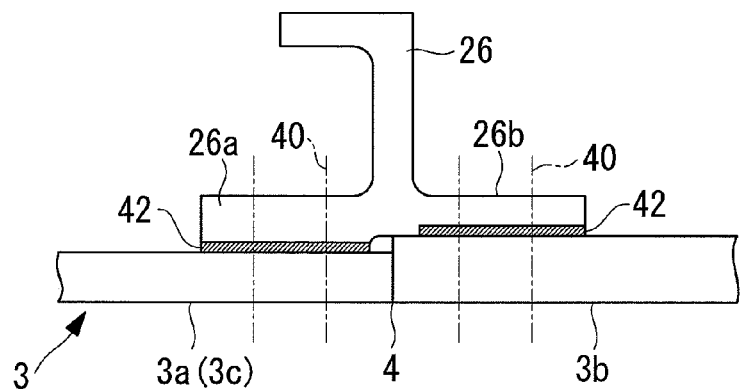
FIG. 6B is a lateral sectional view taken along B-B in FIG. 2, showing another method of securing the stringer and the bottom-surface skin.
Figure 6C:
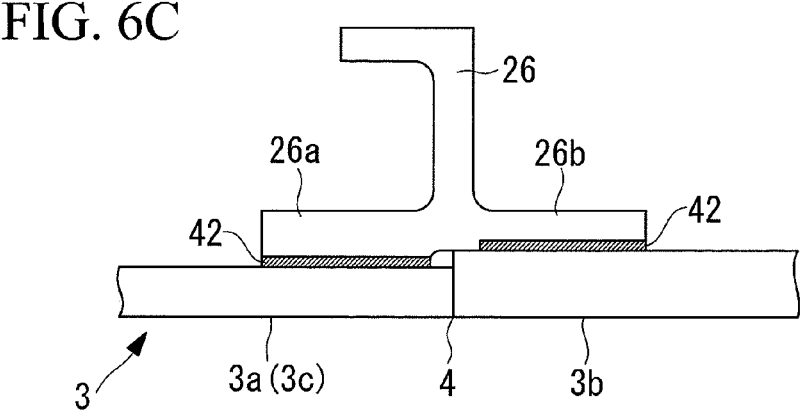
FIG. 6C is a lateral sectional view taken along B-B in FIG. 2, showing another method of securing the stringer and the bottom-surface skin.

In FIGS. 6A to 6C, in order to absorb a difference in plate thicknesses between the center portion 3b and the front portion 3a (or the rear portion 3c), the shape of the stringers 26 is changed. Specifically, plate thicknesses of flanges 26a in the stringer 26 near the front portion 3a (or the rear portion 3c) are made greater than those of flanges 26b thereof near the center portion 3b, and bottom surfaces of the flanges 26a are positioned closer to the front portion 3a.

Like FIG. 4A, FIG. 6A shows a method of securing the stringers 26 and the bottom-surface skin 3 (the center portion 3b, the front portion 3a, and the rear portion 3c) only with the fasteners 40.

Like FIG. 4B, FIG. 6B shows a securing method in which both the fasteners 40 and bonding at the bonding portions 42 are employed.

Like FIG. 4C, FIG. 6C shows a method of securing only by bonding at the bonding portions 42, without employing the fasteners 40.

Next, effects and advantages afforded when employing the main wing 1 with the above-described configuration will be described.

During flight, the main wing 1 is subjected to a load so that a tip thereof is shifted upward. Therefore, the bottom-surface skin 3 of the main wing 1 is subjected to a tensile load in the extending direction (0° direction) thereof. The tensile load in the 0° direction is mainly borne by the front portion 3a and the rear portion 3c of the bottom-surface skin 3 instead of the center portion 3b. This is because, as compared with the front portion 3a and the rear portion 3c, the center portion 3b is mainly formed of the fibers having the +/−45° orientations and is a composite material having low rigidity against a tensile load in the 0° direction. Therefore, because a lower tensile load is exerted on the center portion 3b as compared with the front portion 3a and the rear portion 3c, strength required for the circumferential edges of the access holes 5 is decreased. In other words, as compared with a case in which a composite material with the orientation ratios employed in the front portion 3a and the rear portion 3c is employed, the number of laminated layer (thickness thereof) can be reduced. However, because it is still necessary to bear the concentrated stress exerted at the circumferential edges of the access holes 5, the number of laminated layers in the center portion 3b is greater (thicker) than the number of the laminated layers in the front portion 3a and the rear portion 3c.

Because the center portion 3b is mainly +/−45°, it is reinforced with regard to rigidity in a shearing direction, that is, torsional rigidity. Therefore, the center portion 3b is configured so as not to bear an axial force (tensile load) but to bear a torsional load. In the load exerted on the main wing 1, the torsional load is small, being about 30% relative to the tensile load; therefore, the thickness of the center portion 3b does not need to be increased as much as in the case shown in FIG. 8B in which a tensile load at the bottom-surface skin is directly exerted on the circumferential edges of the access holes.

As shown in FIG. 1B, because the center portion 3b is a separate member from the front portion 3a and the rear portion 3c, peeling like that described using FIGS. 8A and 8B is less likely to occur. In other words, this is because a tensile force is not transmitted between the individual portions 3a, 3b, and 3c, even if there are level differences in the thickness direction between the center portion 3b and both the front portion 3a the rear portion 3c, because each laminated sheet is separated between the center portion 3b and both the front portion 3a and the rear portion 3c.

Because the tapering portion 104b like the one shown in FIG. 8B is not required in this embodiment, the weight can be reduced by the corresponding amount.

Although this embodiment has been described with regard to the application to the bottom-surface skin 3, the present invention is not limited thereto, and wide application is possible so long as composite-material structure having holes are involved.

For example, the same structure as with the bottom-surface skin 3 may be applied to the top-surface skin that forms the torque box together with the bottom-surface skin 3. Although a compressive load is exerted on the top-surface skin in this case, by setting the compressive strength of the center portion, in which the holes are formed, lower than the front portion and the rear portion, concentrated stress exerted at the circumferential edges of the holes formed in the center portion can be alleviated.

Figure 7:
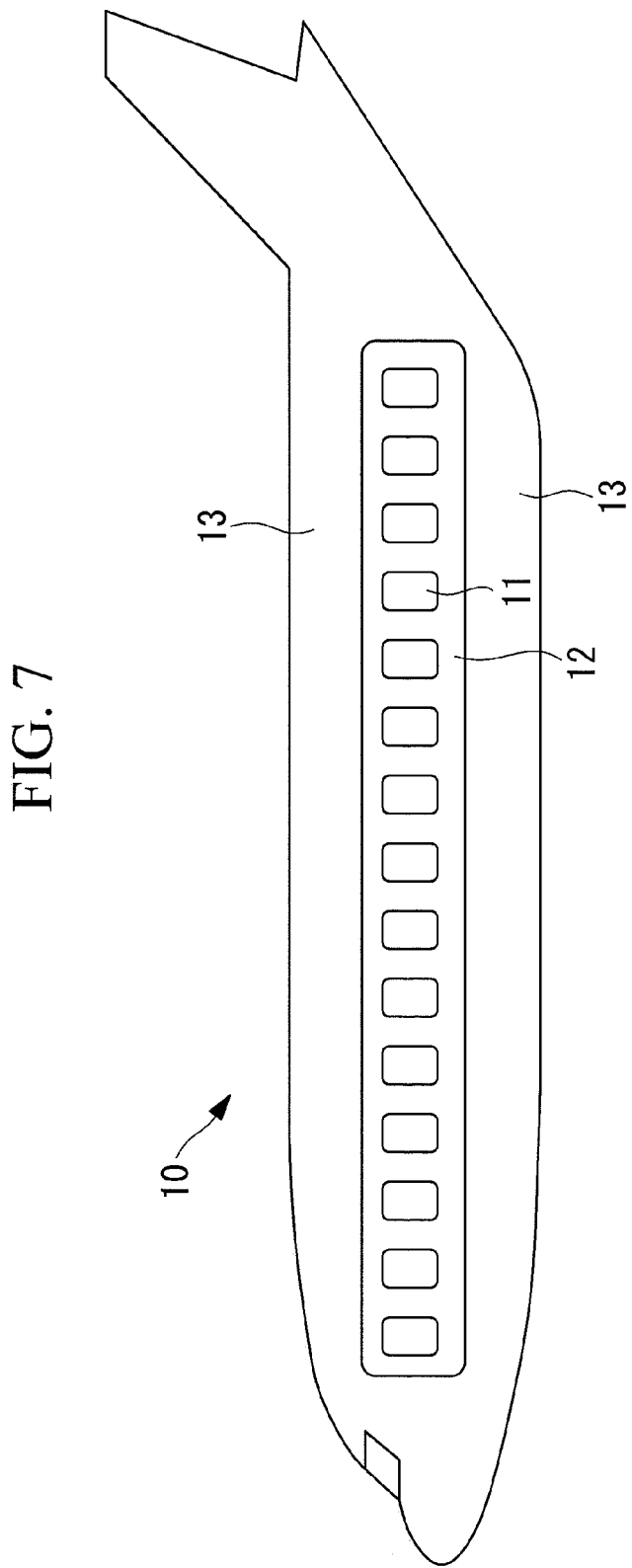
FIG. 7 is a side view showing a fuselage of an aircraft, showing another application example of the composite-material structure of the present invention.

As shown in FIG. 7, the same materials as those in the center portion 3b in the above-described embodiment may be applied to a center portion 12 of an aircraft fuselage 10 in which window holes 11 where window materials are installed are formed, and the same materials as those in the front portion 3a and the rear portion 3c in the above-described embodiment may be applied to other adjacent members 13. Although a bending load (i.e., tensile load and compressive load) is exerted on the fuselage 10 in this case, by setting the tensile strength and the compressive strength of the center portion 12 to be lower than that of the other members 13, concentrated stress exerted at circumferential edges of the window holes 11 formed in the center portion 12 can be alleviated.

Without limitation to aircraft, the composite-material structure of the present invention can also be applied to, for example, ships, vehicles, etc.

Although the above-described embodiment mainly employs the carbon fiber reinforced plastic (CFRP), the present invention is not limited thereto; for example, a glass fiber reinforced plastic (GFRP: Glass Fiber reinforced Plastic) or an aramid fiber reinforced plastic (AFRP: Aramid Fiber reinforced Plastic) may be employed.

REFERENCE SIGNS LIST 1 main wing
3 bottom-surface skin (composite-material structure)
3a front portion (adjacent structural member)
3b center portion (holed structural member)
3c rear portion (adjacent structural member)
5 access hole (hole)

The invention claimed is:

1. An aircraft main wing including a composite structure forming a bottom surface skin, the composite-material structure comprising:
    a holed structural member that is a composite material made of fiber reinforced plastic, the holed structural member extending in a longitudinal direction and having at least one hole formed therein; and
    an adjacent structural member that is a composite material made of fiber reinforced plastic, the adjacent structural member extending in the longitudinal direction and being connected to a side portion of the holed structural member,
    wherein the holed structural member and the adjacent structural member are configured to receive a tensile load and/or a compressive load in the longitudinal direction,
    wherein a tensile rigidity and/or a compressive rigidity of the holed structural member in the longitudinal direction are/is lower than a tensile rigidity and/or a compressive rigidity of the adjacent structural member in the longitudinal direction, and
    wherein the holed structural member and the adjacent structural member are connected at division surfaces that extend in the longitudinal direction, and, the hole is an access hole.

2. The aircraft main wing according to claim 1, wherein the holed structural member is a composite material whose main components are fibers oriented in directions of +/−30° or greater and +/−60° or less, when the longitudinal direction of the main wing is defined as 0°.

3. The aircraft main wing according to claim 1, wherein the holed structural member is a composite material whose main components are fibers oriented in +/−45° directions, when the longitudinal direction is defined as 0°.

4. The aircraft main wing according to claim 1, wherein a plurality of stringers are provided in the longitudinal direction of the bottom-surface of the main wing,
    each of the plurality of stringers secures the holed structural member and the adjacent structural member,
    an increased thickness portion, formed by gradually increasing the thickness thereof with a tapering portion, is provided at an end of the adjacent structural member close to the division surface, and
    each of the stringers is secured to the holed structural member and the adjacent structural member by fasteners including nuts and bolts, and/or by bonding.

5. The aircraft main wing according to claim 1, wherein a plurality of stringers are provided in the longitudinal direction of the bottom-surface of the main wing,
    each of the plurality of stringers secures the holed structural member and the adjacent structural member,
    fillers are interposed between each of the stringers and the adjacent structural member, and
    each of the stringers is secured to the holed structural member and the adjacent structural member by fasteners including nuts and bolts and/or by bonding.

6. The aircraft main wing according to claim 1, wherein a plurality of stringers are provided in the longitudinal direction of the bottom-surface skin of the main wing,
    each of the plurality of stringers secures the holed structural member and the adjacent structural member,
    plate thicknesses of flanges in the stringer near the adjacent structural member are greater than thicknesses of flanges thereof near the holed structural member, and bottom surfaces of the flanges near the adjacent structural member are positioned closer to the adjacent structural member, and
    each of the stringers is secured to the holed structural member and the adjacent structural member by fasteners including nuts and bolts, and/or by bonding.

7. A bottom-surface skin of an aircraft main wing, the bottom-surface skin comprising:
    a holed structural member that is a composite material made of fiber reinforced plastic, the holed structural member extending in a longitudinal direction and having at least one hole formed therein;
    a first adjacent structural member that is a composite material made of fiber reinforced plastic which extends in the longitudinal direction and which is connected to a leading side portion of the holed structural member; and
    a second adjacent structural member that is a composite material made of fiber reinforced plastic which extends in the longitudinal direction and which is connected to a trailing side portion of the holed structural member; and
    a plurality of stringers are provided in the longitudinal direction of the main wing at division surfaces of the holed structural member and the first and second adjacent structural members, each of the stringers being secured to the holed structural member and the adjacent structural member by fasteners including nuts and bolts, and/or by bonding, wherein the holed structural member and the first and second adjacent structural members are configured to receive a tensile load and/or a compressive load in the longitudinal direction, wherein a tensile rigidity and/or a compressive rigidity of the holed structural member in the longitudinal direction are/is lower than a tensile rigidity and/or a compressive rigidity of the first and second adjacent structural members in the longitudinal direction, and wherein the hole of the holed structural member is an access hole.

8. An aircraft fuselage comprising:

a composite-material structure comprising:

a holed structural member that is a composite material made of fiber reinforced plastic, the holed structural member extending in a longitudinal direction of the composite-material structure and at least one hole is formed therein;

an adjacent structural member that is a composite material made of fiber reinforced plastic which extends in the longitudinal direction and which is connected to a side portion of the holed structural member; and a plurality of stringers that are provided in the longitudinal direction of the aircraft fuselage at division surfaces of the holed structural member and the adjacent structural member, wherein a plate thickness of the holed structural member is greater than a thickness of the adjacent structural member, wherein each of the stringers is secured to the holed structural member and the adjacent structural member by fasteners including nuts and bolts, and/or by bonding, wherein fillers are interposed between each of the stringers and the adjacent structural member to absorb a difference in plate thicknesses between the holed structural member and the adjacent structural member, wherein the holed structural member and the adjacent structural member are configured to receive a tensile load and/or a compressive load in the longitudinal direction, wherein a tensile rigidity and/or a compressive rigidity of the holed structural member in the longitudinal direction are/is lower than a tensile rigidity and/or a compressive rigidity of the adjacent structural member in the longitudinal direction, and wherein the holed structural member and the adjacent structural member are connected at division surfaces that extend in the longitudinal direction, and, the hole is a window hole where window materials are installed.

9. The aircraft fuselage according to claim 8, wherein the holed structural member is a composite material whose main components are fibers oriented in directions of +/−30° or greater and +/−60° or less, when the longitudinal direction is defined as 0°.

10. The aircraft fuselage according to claim 8, wherein the holed structural member is a composite material whose main components are fibers oriented in +/−45° directions, when the longitudinal direction is defined as 0°.

11. The aircraft fuselage according to claim 8, wherein an increased thickness portion formed by gradually increasing the thickness thereof with a tapering portion is provided at an end of the adjacent structural member close to the division surface.

12. The aircraft fuselage according to claim 8, wherein plate thicknesses of flanges in the stringer near the adjacent structural member are made greater than thicknesses of flanges thereof near the holed structural member, and bottom surfaces of the flanges near the adjacent structural member are positioned closer to the adjacent structural member.

\* \* \* \* \*